(No Model.)
McDUFF SIMPSON.
FLOWER POT.
No. 592,066. Patented Oct. 19, 1897.
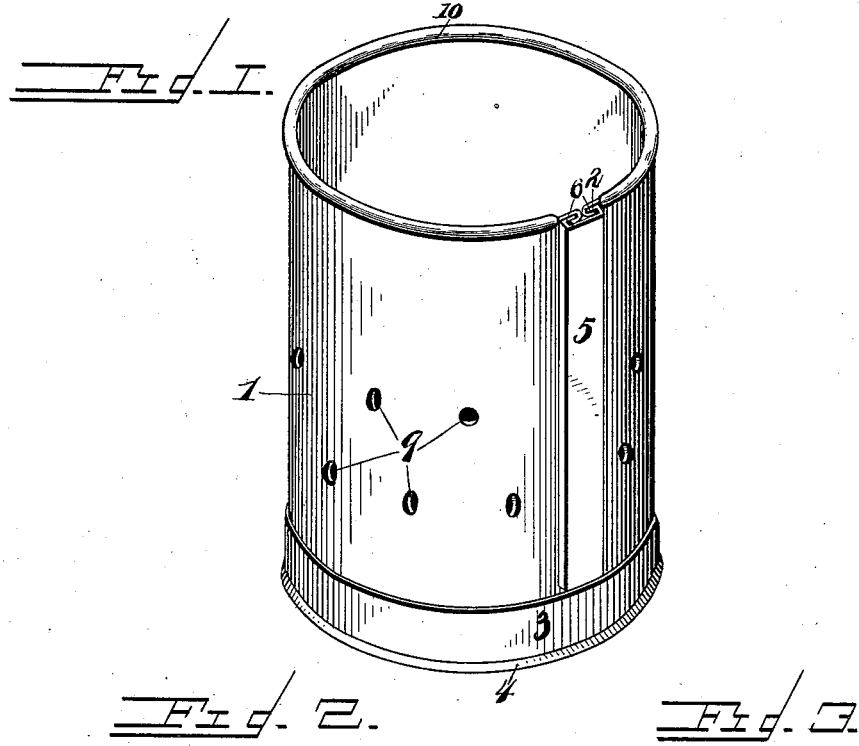
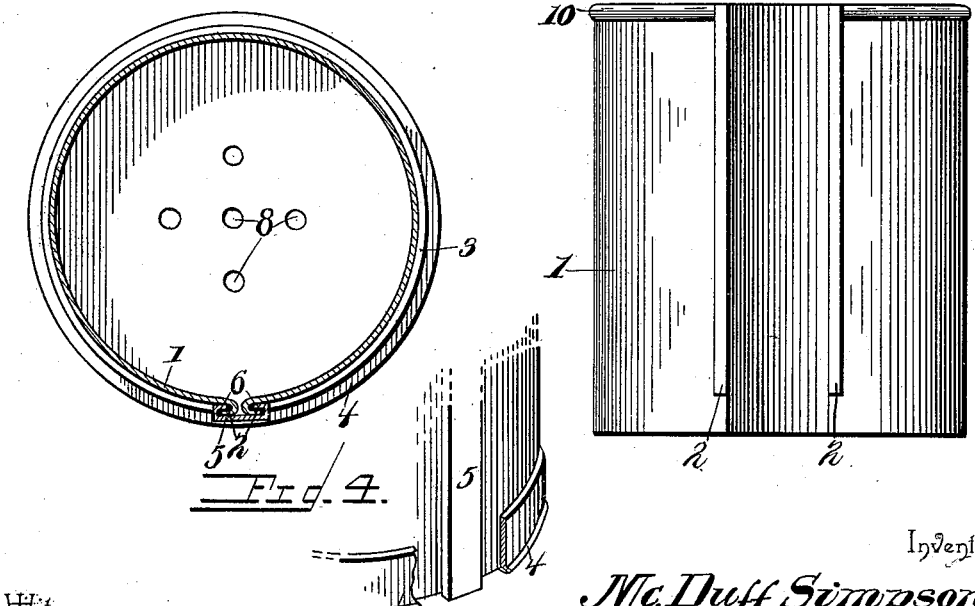
Witnesses
R. Shepard
Edwin Cruse
Inventor
McDuff Simpson
By his Attorneys,
C. A. Snow & Co.

United States Patent Office.

McDUFF SIMPSON, OF BRYAN, TEXAS.

FLOWER-POT.

SPECIFICATION forming part of Letters Patent No. 592,066, dated October 19, 1897.

Application filed February 15, 1897. Serial No. 623,480. (No model.)

*To all whom it may concern:*

Be it known that I, McDUFF SIMPSON, a citizen of the United States, residing at Bryan, in the county of Brazos and State of Texas, have invented a new and useful Flower-Pot, of which the following is a specification.

The object of this invention is to provide a flower-pot in which plants may be propagated, and in which they may be kept until grown to a size sufficient for transplanting. In the raising of tender plants it is necessary in the colder climates to start them first in a hothouse or other protected place, and this is usually done by placing them in pots from which they are subsequently transplanted to the open fields. Unless great care is exercised this transplanting frequently results in a shaking and displacement of the roots of the plant, which is detrimental to the health of the plant and has a tendency to retard its growth and frequently results in killing it. In order to overcome this disadvantage, I so construct the pot that it will be capable of being removed from the plant and the dirt in which the plant is supported, as distinguished from having the dirt and plant removed from the pot. This I accomplish by providing the pot with a removable bottom and by forming its body of flexible sheet metal, the side edges of which are held together by a vertically-sliding locking-strip.

The invention will be fully described hereinafter, and particularly pointed out in the claim.

In the drawings, Figure 1 is a perspective view of a flower-pot constructed in accordance with my invention. Fig. 2 is a horizontal section through the flower-pot. Fig. 3 is a side elevation of the pot showing the bottom and the locking-strip removed therefrom. Fig. 4 is a view of a portion of the lower end of the pot, showing a modified construction.

Similar reference-numerals indicate similar parts in the several figures.

The body of the pot is formeed of flexible sheet metal, such as tin or galvanized iron. The blank from which the body of the pot is formed is indicated by 1 and is preferably rectangular in form. The meeting edges of the blank are bent outwardly and over toward the main body to form oppositely-disposed flanges 2, and these flanges may extend the whole length of the pot, as shown in Fig. 4, or they may terminate at the upper edge of the flange 3 of the removable bottom 4, as shown in Fig. 1, as preferred.

5 indicates the locking-strip, which consists of a strip of sheet metal having its edge bent inwardly to form oppositely-disposed flanges 6, which interlock with the flanges 2 on the meeting edges of the blank 1 and hold the edges together. The removable bottom 4 may be provided with any suitable number of perforations, as indicated at 8, for the purpose of drainage, and the body of the pot may also be perforated, as indicated at 9, for the purpose of admitting air to the roots of the plant. The top edge of the pot may be rolled, as indicated at 10, although this is not an essential feature of the invention. The body of the pot may also be made tapering in form, if desirable, similar to the ordinary clay pots.

When it is desired to transfer a plant from the pot to the ground, it is only necessary to make a hole a little larger than the pot. The bottom 4 is then removed from the pot and the pot placed in the hole, after which the locking-strip 5 is moved in a vertical direction to disengage it from the flanges on the edges of the pot, and the latter will then be free to expand and become detached from the soil around the roots of the plant, when it may be easily removed from the hole, and after filling the space around the roots of the plant and the earth attached to them the transplanting will be completed. It will be seen, therefore, that during the transplanting the roots of the plant and the soil around them will not be disturbed in the slightest manner, and consequently no injury is likely to occur to the plant on account of transplanting it.

It will be understood that changes in the form, proportion, and minor details of construction may be resorted to without departing from the spirit or sacrificing any of the advantages of this invention.

Having thus described my invention, what I claim is—

A flower-pot consisting of a body portion formed from a plate of flexible sheet metal, capable of being bent into cylindrical form and having its meeting edges bent outwardly to form oppositely-disposed flanges, a removable sheet-metal strip having flanges formed thereon to interlock with the flanges on the edges of the body portion to lock them together, and a removable bottom, the flanges and the locking-strip terminating at their lower ends at the upper edge of the removable bottom, and the body and bottom of the pot being provided with a series of openings, substantially as described.

In testimony that I claim the foregoing as my own I have hereto affixed my signature in the presence of two witnesses.

McDUFF SIMPSON.

Witnesses:
JNO. M. WILSON,
R. W. ODOM.